United States Patent
Manrique et al.

(10) Patent No.: US 9,068,446 B2
(45) Date of Patent: *Jun. 30, 2015

(54) FORMULATION AND METHOD OF USE FOR EXPLOITATION AND TRANSPORT OF HEAVY AND EXTRA HEAVY OIL WELLS

(71) Applicant: Intevep, S.A., Caracas (VE)

(72) Inventors: Pablo Manrique, Caracas (VE); Franklin Archer, Caracas (VE)

(73) Assignee: Intevep, S.A., Caracas (VE)

( * ) Notice: Subject to any disclaimer, the term of this patent is extended or adjusted under 35 U.S.C. 154(b) by 52 days.

This patent is subject to a terminal disclaimer.

(21) Appl. No.: 13/935,644

(22) Filed: Jul. 5, 2013

(65) Prior Publication Data
US 2014/0008062 A1    Jan. 9, 2014

Related U.S. Application Data

(63) Continuation-in-part of application No. 12/973,022, filed on Dec. 20, 2010, which is a continuation-in-part of application No. 13/474,769, filed on May 18, 2012, which is a continuation-in-part of application No. 13/529,140, filed on Jun. 21, 2012, which is a continuation of application No. 13/655,776, filed on Oct. 19, 2012.

(51) Int. Cl.
*E21B 43/16* (2006.01)
*C09K 8/60* (2006.01)
*C09K 8/584* (2006.01)

(52) U.S. Cl.
CPC ............... *E21B 43/16* (2013.01); *C09K 8/602* (2013.01); *C09K 8/584* (2013.01)

(58) Field of Classification Search
CPC ......... C09K 8/584; C09K 8/602; E21B 43/16
USPC ................................ 166/300, 270.1, 305.1
See application file for complete search history.

*Primary Examiner* — Zakiya W Bates
*Assistant Examiner* — Silvana Runyan
(74) *Attorney, Agent, or Firm* — Bachman & LaPointe, PC

(57) ABSTRACT

A combined injection, production and transportation method includes the steps of introducing a mixture of a surfactant, a co-surfactant and a carrier fluid into each of a production well and an injection well so that the mixture flows into porous media surrounding the production well and the injection well, and holding the reservoir mixture in the porous media surrounding the production well in the presence of water for a period of time sufficient to form a water film on surfaces of the porous media surrounding the production well. An injection fluid is then injected into the injection well while producing from the production well, whereby hydrocarbons flow from the porous media around the injection well toward the production well. An injection mixture of a surfactant and a carrier fluid is injected downhole into a desired point in tubing of the production well so that the tubing injection mixture mixes with the production stream forming an emulsion, and the emulsion flows through the tubing to the wellhead. The emulsion can be transported to intermediate locations and then broken and re-formulated for further transport.

41 Claims, 11 Drawing Sheets

| Contact angle measurement before | Photograph | Contact angle measurement after INTESURF™ | Photograph |
|---|---|---|---|
| 137.5° |  | 45.1° |  |

FORMULATION AND METHOD OF USE FOR EXPLOITATION AND TRANSPORT OF HEAVY AND EXTRA HEAVY OIL WELLS

CROSS REFERENCE TO RELATED APPLICATIONS

This application is a continuation-in-part of each of U.S. patent application Ser. No. 12/973,022 which was filed on Dec. 20, 2010 and claims the benefit of provisional application Ser. No. 61/549,631; U.S. patent application Ser. No. 13/474,769 which was filed on May 18, 2012 and claims the benefit of provisional application Ser. No. 61/549,631; U.S. patent application Ser. No. 13/529,140 which was filed on Jun. 21, 2012 and claims the benefit of provisional application Ser. No. 61/549,534; and U.S. patent application Ser. No. 13/655,776 which was filed on Oct. 19, 2012 and claims the benefit of provisional application Ser. No. 61/549,406.

BACKGROUND OF THE INVENTION

The invention relates to a formulation and method of using same for improving well productivity and oil recovery factor in hydrocarbon reservoirs and improving the transportation of said oil through pipelines from downhole to potentially very long distances from the natural source to processing units such as refineries, oil improvement units or dehydrating and/or diluting treatment sites for improving quality and flowability of natural heavy and extra heavy oil, and use of the formulation in an integral exploitation method to improve cold production recovery factor and transport of heavy and extra heavy oil.

Improvement of reservoir recovery factor and flowability in tubing and pipelines of very viscous heavy oil, and improvement of well productivity of heavy and extra heavy oil reservoir wells such as those found in the Orinoco River Belt in the Bolivarian Venezuelan Republic, is clearly desirable. Increase of the recovery factor in cold exploitation of such reservoirs and easy transportation of such resources through existing infrastructure and low cost means of cold transportation through long distances is a real need. Some of the largest reservoirs of heavy and extra heavy oil in the world are in Venezuela and hold oil having API gravity within the range of 6 to 16. Unfortunately, recovery factors of such reservoirs, and well production rate of much of this oil is unacceptable, and the possibilities of transporting the produced viscous oil by pipeline for long distances away from the well site are disappointing.

It is a high concern in the exploitation of heavy and extra heavy oil reservoirs to increase the final oil-in-place recovery during the reservoir lifetime, and also to increase productivity of the wells and lower the surface transportation cost to improve the overall economic value of the exploitation. Centralization of the wells or pad of wells production in a high capacity production processing unit where oil treatment can be achieved on a greater scale for demulsification, dehydration, desalting, or further processing; such as the refining of said oil or upgrading treatment in an oil process unit for improving the flowability and sour characteristics of the oil for further processing or refining is desirable.

To satisfy these needs, primary cold production schemes are quickly abandoned in favor of thermal methods to improve well flowability by reducing oil viscosity in the reservoirs, high output pumping systems are used to output the oil to the surface, and a combination of dilution and pumping through surface pipelines make it possible to transport heavy and extra heavy oil to production units. These processes, however, are very costly. The wells still remain with very low productivity, and reservoirs still have a very low output in terms of final oil recovery. More than 90% of the original oil in place is left behind in the reservoir. In addition, extremely serious problems of sour gas production such as $H_2S$ and $CO_2$ are being reported and increase with steam injection in the several pilot thermal production methods evaluated. This sour gas production in a mass scale is a threat to life in or near to populated areas, requires high security standards for workers in the facilities, further these processes are limited by the availability in amount and cost of current downhole or surface sour gas mitigation abilities. Thermal recovery methods, lifting and surface transportation methods typically produce final oil recovery below 15%.

Venezuelan heavy and extra heavy Orinoco River Belt oil sandstones are exceptional reservoirs. 60% of the reservoirs of this type have a KH/U value between 40 and close to 1,000 in very many cases. Unlike other reservoirs, however, the oil in Venezuelan extra heavy oil reservoirs is flowable at reservoir conditions.

Even these wells, however, have a final recovery by cold production which is very low and perhaps in most cases below three (3) percent of the original oil in place. The conditions for flow of oil in those reservoirs, with even excellent petrophysical properties, are very unfavorable to the flow of oil. The components of the heavy and extra heavy oil, particularly the asphaltenes in natural form in the native oil, are capable by natural fluid-rock interactions of generating an oil-wet condition at the surface of the natural mineral components of the sandstone. This produces the most adverse conditions to flow of oil in a porous media. This is a natural oil-wet condition of the reservoir media, which is a completely different condition as compared to formation damage in the well resulting from drilling or production activities, which could also happen in the well. The viscosity of the oil changes dramatically with the change in temperature and therefore there is greater drag pressure in the flow during lifting of the oil through the tubing and flowing in pipelines at surface conditions. To improve flow in the pipelines of the natural oil, known efforts include diluting with naphtha, gasoil, and diluents of light oil, but this is costly and the use of such diluents is not practical in high mass production scenarios such as the Orinoco River Belt well production area.

The need still exists to increase final oil-in-place recovery during the reservoir lifetime, to increase the productivity of wells and to reduce surface transportation cost to improve the overall economic value of the exploitation in an easy, environmentally safe and highly economic return of investment in cold production exploitation schemes of heavy and extra heavy oil reservoirs.

SUMMARY OF THE INVENTION

As a response to the above problems, especially to the natural oil wet conditions of the sandstone, extremely low well productivity, low recovery of the original oil in place, and high drag flow pressure loss through tubing and surface lines of the heavy and extra heavy oil, the present invention provides a formulation or stimulation fluid and a method of using the formulation for exceptional improvement in all these parameters. Oil in place final recovery of the reservoir, productivity of the well and ease in flow of the heavy and extra heavy oil through pipelines in cold production schemes are accomplished. The result is reflected by a better flow rate in the producing wells, a lower pressure drawdown, an improved oil recovery from the drainage area of the formation and a high capacity of flow of oil as water emulsion to any desired location potentially far away from downhole, to the wellhead and surface conventional facilities. Reservoir patterns of flow of oil are improved in the reservoir as a whole by fluid injection through an injection well in communication with the production well and production stream with areas of very low drag forces achieved by the injection at any desired location in the tubing downhole or at a desired point at surface to the flowline system of another surfactant formulation in an aqueous solution that mixes with the production stream to form an emulsion and reduce the drag forces that are produced by increase in viscosity of the heavy and extra heavy oil as it cools down. Untreated, this could reduce oil production to nil.

Injection wells are sometimes used as part of a production or exploitation scheme, wherein injection of fluids into one well drives fluids from the area of the injection well to a production well, where production rates are improved.

The reservoir formulation of the present invention can advantageously be used to improve the flow conditions at both the injection well and the production well and to allow mobilization of oil which is immobile in the porous media due to its affinity to the oil wet surface of the mineral of the rock due to the adsorption of the heavy component of the oil in the mineral surface, and particularly, the asphaltenes. This is done by changing the oil wet condition of the surface to a new water wet condition.

Based upon the foregoing, the present invention therefore provides a combined injection, production and transportation method which comprises the steps of establishing a production well and an injection well into a hydrocarbon-bearing formation and a surface flow line system for carrying a production stream from the production well; introducing a mixture of a surfactant, a co-surfactant and a carrier fluid into each of the production well and the injection well so that the mixture flows into porous media surrounding the production well and the injection well; holding the mixture in the porous media surrounding the production well in the presence of water for a period of time sufficient to form a water film on surfaces of the porous media surrounding the production well; injecting an injection fluid into the injection well while producing from the production well, whereby hydrocarbons flow from the porous media around the injection well toward the production well; introducing an injection mixture of a surfactant and a carrier fluid downhole into a desired point in a production tubing of the production well so that the injection mixture mixes with the production stream to form an emulsion; producing the emulsion through the tubing to the surface flow line to a desired distance away from the production well, whereby drag forces in the system are reduced from downhole through the surface flow line to a desired location at the surface. Other aspects and details of the present invention will appear below.

BRIEF DESCRIPTION OF THE DRAWINGS

A detailed description of preferred embodiments of the present invention follows, with reference to the accompanying drawings, wherein.

DETAILED DESCRIPTION

Figure 1:
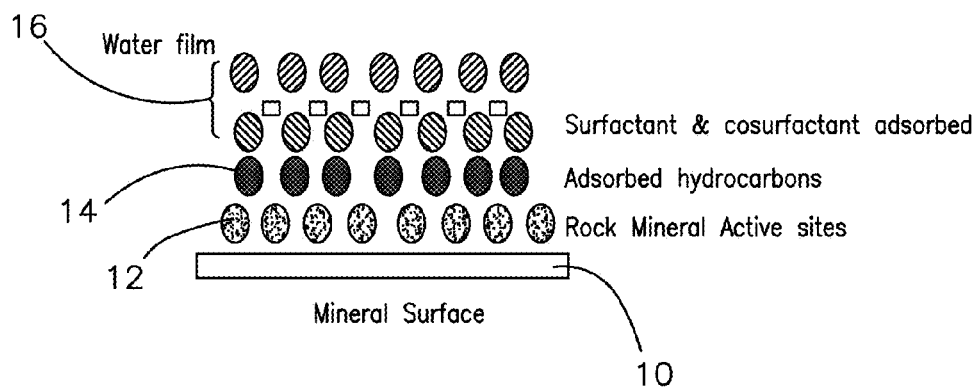
FIG. 1 schematically illustrates a treated surface in accordance with the invention.

The invention relates to a reservoir formulation for a stimulation and injection fluid which has a surfactant/co-surfactant mixture, and a method for using same to treat surfaces of a hydrocarbon bearing formation and thereby enhance flow of hydrocarbons through same. Another formulation is used in a tubing injection which mixes the formulation with the production stream, in a desired location in a production well tubing wherein the mixture is capable of forming an emulsion which flows through the tubing to the wellhead and for very long distances from wellhead to the any desired target location at surface, with very low drag forces and therefore very low pressure loss. This method is advantageously used to alter flow conditions in the formation to improve production of hydrocarbons from hydrocarbon-bearing formations, and once the heavy and extra heavy oil is in the well, to allow easy and economic production and transportation of that very viscous oil for potentially very long distances to a target location at the surface.

As mentioned above, many significant hydrocarbon deposits in the world contain very large quantities of hydrocarbons under conditions where it is very difficult to produce and transport them. One example of this is asphaltene-bearing hydrocarbon deposits in the Orinoco River Belt of Venezuela. In these formations, which typically have high and low pressures in the range of 300-1,500 psi, the heavy hydrocarbon fractions contained in the formation, especially asphaltenes, tend to adhere to the pore surfaces of the hydrocarbon and thereby create an oil-wet environment in the reservoir. This oil-wet flow environment is not at all conducive to production of those hydrocarbons from the formation. Further, as will be demonstrated below, this asphaltene is not easily removed because a portion of the hydrocarbon adsorbs into the rock surface making even cleaned surfaces oil wet and, therefore, unfavorable for good hydrocarbon flow. Thus, most of the hydrocarbons tend to be immobile in the porous media under these conditions.

According to the invention, a water film is formed over the rock surfaces and also over the chemically adsorbed hydrocarbon so that the surfaces when coated in this manner are water wet. This greatly increases the flowability of hydrocarbons through the treated rock formation to a production well. Once in the well there is still a need to improve the flowability of the heavy and extra heavy oil to a desired location at surface, but in normal conditions this is very difficult since the oil cools down and increases in viscosity occur, making it difficult or even impossible to achieve flow through the flow system, or flow occurs at a very high pressure drop.

In accordance with the present invention, one formulation, referred to herein as a reservoir surfactant/co-surfactant mixture, or mixture, is used to form a water film over the pore spaces of the formation, and also over the asphaltenes adhered to the pore surfaces, so as to provide a water-wet surface between the flow surfaces defined by the pore surface of the rock and asphaltene adhered thereto, and the volume of hydrocarbon in the formation which is intended to be produced. This water film increases flow of hydrocarbons through the formation and allows mobilization of oil which was immobile in the pore space due to affinity to the natural oil wet original surface, and thereby enhances production of hydrocarbon from the formation to the production well. Another formulation according to the invention, referred to herein as a tubing injection mixture, or injection mixture, comprises an aqueous solution with a surfactant. The tubing injection mixture is mixed with the well production stream and allows the transportation of the heavy oil with low pressure drop through the production tubing and then conventional pipeline systems for very long distances.

The reservoir mixture in combination with the tubing injection mixture disclosed can advantageously be used to improve flow conditions both in injection and production wells to enhance reservoir production and at the same time to allow the transportation of the very viscous heavy and extra heavy oil through conventional pumping systems for very long distances, even hundreds of kilometers from the wellhead to a target location, at very low pressure drop. Over a period of time, in the case of the production well, the water film eventually is removed by fluids flowing past the film. At this point, the reservoir surfactant/co-surfactant mixture of the present invention can again be introduced into the hydrocarbon bearing formation to again deposit a water film for use in the next period of production. While re-establishing the water film at the production well, injection flow can be continued at the injection well. Also, in any desired location far from the wellhead, in a transition location at the surface, production from other wells can be mixed through a gathering system and collected as a field production stream and either be pumped as an oil in water emulsion to another further location or placed in a facility to break the oil in water emulsion, desalt the oil phase and use a surface aqueous solution mixture with surfactants to form a very long distance oil emulsion capable of being transported for very long distances to heavy and extra heavy oil improvement facilities such as an upgrader of the oil or a desouring and upgrading facility and/or ultimate refining facility.

According to the invention, the reservoir surfactant/co-surfactant mixture preferably contains surfactant, co-surfactant and a fluid carrier, each of which has the following preferred constituents.

The reservoir mixture surfactant is preferably selected from the group consisting of anionic surfactant, cationic surfactants, non-ionic surfactants, amphoteric surfactants and combinations thereof. The reservoir mixture surfactant is further preferably an ethoxylated nonyl phenol having between 4 and 60 ethoxylated groups.

Suitable non-ionic surfactants include but are not limited to octilphenol having 9-16 EO, nonylphenol with an EO number from 4 to 80, preferably 20-55, fatty acids of 9-20 EO, n-tetradecanol of 9-20 EO, n-hexadecanol of 9-20 EO, laurate of sorbitan, and ethoxylated fatty alcohols with EO number from 4 to 25, preferably 9-20. Suitable ionic surfactants include but are not limited to n-alkyl sulfates of K or Na, n-alkyl trimethyl ammonium chloride and combinations thereof and petroleum sulphonates.

It is known that various hydrocarbons contain a natural surfactant which, when activated, can be a very effective surfactant. Activators of such natural surfactants are known to persons skilled in the art, and can include, for example, buffer additives such as water soluble amines and the like. The activated natural surfactant can be utilized as a surfactant of the reservoir mixture, and also as the injection mixture which is used to form an emulsion in the production tubing, as will be discussed further below.

In connection with the reservoir mixture, it should also be noted that the fluid for forming the desired water film in the reservoir can include activators of the natural surfactant as discussed above, either alone with the co-surfactant of the present invention, or in combination with other surfactants and the co-surfactant, all within the broad scope of the preset invention. Within this broad scope, it is nevertheless preferred to use surface-prepared surfactant and co-surfactant as discussed herein.

The reservoir mixture co-surfactant is preferably an alcohol co-surfactant, preferably one or more n-alcohols (C1-C6), and more preferably selected from the group consisting of methanol, ethanol, propanol, butanol, pentanol, isopropanol and combinations thereof. The most preferred reservoir mixture co-surfactant is methanol and/or ethanol.

The reservoir mixture carrier fluid can be the same or different for the injection well and the production well. The reservoir mixture carrier fluid for treating the production well can be selected from the group consisting of water, brine, production water and mixtures. Organic solvents, light hydrocarbons, diluents, light crude oil and combinations thereof are also suitable in the case of the reservoir mixture using organic carrier fluids. More specifically, the carrier fluid for the production well can be light oil, a light refinery cut, gasoil, diesel, diluent and/or water. The most preferred reservoir mixture carrier fluids include water, brine and production water fluid and mixtures. One example of reservoir mixture water base carrier fluid is the production water of the field normally treated and delivered through disposal wells to the underground. Another reservoir mixture production carrier fluid is compatible light crude oils with API gravity between 20 and 45 API, preferably between 20 and 25 API. Also, some mixtures of compatible crude oil with the formation fluids and/or naphtha or diluents normally used downhole or on the surface for mixing with the native oil for reducing viscosity of the heavy and extra heavy oil stream for transportation in surface facilities can be used as production well carrier fluid.

The reservoir mixture carrier fluid for the injection well, on the other hand, can be selected from the group consisting of water, brine, production water and mixtures, all of them tested for compatibility with the formation fluids and minerals present in the rock. The most preferred carrier fluid for the injection well is the production water. One example of water base carrier fluid is production water of the field which would normally be treated and delivered through disposal wells to the underground.

Exceptionally, in the case of very thin formations, organic fluids like solvents, light hydrocarbons, diluents, light crude oil and combinations thereof could be used as a reservoir mixture carrier fluid for the injection well. Thickness of the reservoir sand pack in such cases could be in the range of between 3 and 7 feet.

The surfactant/co-surfactant reservoir mixture for the producing well is preferably prepared having substantially equal amounts by volume of the surfactant and co-surfactant, and the overall mixture with reservoir mixture carrier fluid in the production well preferably contains each of the surfactant and co-surfactant in an amount between 0.5 and 5% by volume, more preferably between 1 and 4% by volume.

The surfactant/co-surfactant reservoir mixture for the injection well is preferably prepared having substantially equal amounts by volume of the surfactant and co-surfactant, and the overall mixture with carrier fluid in the injection well preferably contains each of the surfactant and co-surfactant in an amount between 0.001 and 3% by volume, more preferably between 0.01 and 0.5% by volume.

In accordance with the invention, the surfactant/co-surfactant reservoir mixture can be prepared by mixing the above-identified constituents at the surface and then transporting, for example by pumping, the resulting reservoir mixture or stimulation fluid into a hydrocarbon producing formation, for example through a well positioned from the surface to the subterranean formation, so that the mixture penetrates into the hydrocarbon-bearing formation around the well, typically into a radius surrounding the well of at least about 2 inches, preferably between 12 inches and as large as possible, for example up to 10 feet when it is squeezed into the producing well or otherwise pumped to the formation and letting it naturally flow through the best channel of flow in the sandstone, as in the case, for example, of horizontal wells. The penetration area into the formation is the area to be treated in accordance with the present invention.

In the injection well, the reservoir mixture is normally injected by natural flow due to the low pressure in the formation (200 to 1200 psi) and the hydrostatic column weight (1500 ft to 4000 ft). The reservoir mixture injected fluid is injected at a very low flow rate to allow gradual contact of the injected fluid with the mineral rock surface and to allow formation of the water film over the hydrocarbon adsorbed on the mineral surface of the rock. As the water film is being formed by continuous injection of the reservoir mixture injected fluid to the formation by means of the injection well, the oil in the porous media which had been immobile due to its affinity with the natural oil wet condition of the pore surface starts mobilization to the producing well. By this drainage mechanism, the reservoir mixture water-based injection fluid is capable of producing an exceptionally high recovery of at least 55% vol. of the initial oil in place (IOIP) as shown in the examples of displacement test presented below. This is true even though the viscosity of the injected water is very low compared with the viscosity of the heavy oil, and this is believed to be because the increase in the oil recovery is not by a piston like displacement pattern mechanism of the reservoir mixture injected fluid through the injection well but due to a wettability change of the pore space surface, the reservoir mixture water based fluid imbibition and drainage of the mobilized heavy and extra heavy oil in the new surface pore space toward the production well. Several different methods can be used to allow a controlled distribution of the fluid in the sandstone while injecting the fluid to the formation. In horizontal injecting wells or vertical injecting wells an improvement in the selected placement or distribution of the fluid in vertical heterogeneous sand packs or very long horizontal zones through the sand can be accomplished through the use of downhole packers and/or isolation packers including means in such tools for flow rate control and open and close control position systems operated from the surface.

Once a sufficient volume of fluid is pumped into the formation, this volume is then held in place in the formation at the production well in the presence of water for a time sufficient to form the desired water film over surfaces of the pore spaces of the hydrocarbon and also over the hydrocarbons adhered to these surfaces. This advantageously provides a water-wet flow environment which is advantageous to the flow of hydrocarbon through the porous media, and therefore produces a flow environment which is far more conductive to the flow of oil than the natural oil-wet flow environment present in the well under natural formation conditions wherein the heavy hydrocarbons, and especially asphaltenes, are adhered to the pore surfaces of the porous media. The suitable amount of time to hold the fluid in the formation will vary with different wells, fluids and conditions, but will typically be between 12 and 24 hours in the production well before restart of flow, and a preferred range of time is between 18 and 24 hours. In the injection well the change from oil wet to water wet on the surface of the porous media is made while the injected fluid is flowing and contacting the porous media through continuous injection through the injection well.

The injection fluid for use in the method of the present invention to inject into the injection well during normal operation of the production method can be any injection fluid which would be known to a person of ordinary skill in the art. Within this broad scope, it is preferred that the injection fluid be an aqueous mixture of surfactant and co-surfactant similar to the reservoir mixture. Thus, the injection fluid can include a surfactant selected from the group consisting of anionic surfactants, cationic surfactants, non-ionic surfactants, amphoteric surfactants and combinations thereof, and further preferably an ethoxylated nonyl phenol having between 4 and 60 ethoxylated groups. The injection fluid can also include a co-surfactant which is preferably an alcohol co-surfactant, preferably one or more n-alcohols (C1-C6), and more preferably selected from the group consisting of methanol, ethanol, propanol, butanol, pentanol, isopropanol and combinations thereof. The carrier fluid of the injection fluid can preferably be selected from the group consisting of water, brine, production water and mixtures, all of them tested for compatibility with the formation fluids and minerals present in the rock. The most preferred carrier fluid for the injection well is production water. One example of water base carrier fluid is production water of the field which would normally be treated and delivered through disposal wells to the underground. Finally, the surfactant/co-surfactant mixture for the injection fluid is preferably prepared having substantially equal amounts by volume of surfactant and co-surfactant, and the overall mixture with carrier fluid for the injection fluid preferably contains each of the surfactant and co-surfactant in an amount between 0.001 and 3% by volume, more preferably between 0.01 and 0.5% by volume.

According to the invention, the tubing injecting mixture is an aqueous solution comprising a surfactant or a mixture of surfactants. The mixture preferably contains surfactants selected from the group consisting of anionic surfactants, non-ionic surfactants, amphoteric surfactants and combinations thereof. The tubing injection mixture of surfactants is further preferably an ethoxylated alcohol having between 2 and 15 ethoxylated groups and an ethoxylated nonyl phenol having between 4 and 15 ethoxylated groups.

Suitable non-ionic tubing injecting surfactants include but are not limited to octilphenol having 9-15 EO, nonylphenol with an EO number from 4 to 15, preferably 15, fatty acids of 9-15 EO, n-tetradecanol of 9-15 EO, n-hexadecanol of 9-15 EO, laurate of sorbitan, and ethoxylated fatty alcohols with EO number from 4 to 20, preferably 9-15. Suitable tubing injection ionic surfactants include but are not limited to n-alkyl sulfates of K or Na, n-alkyl trimethyl ammonium chloride and combinations thereof and petroleum sulphonates.

It should also be noted that, within the broad scope of the present invention, the injection mixture surfactant can be natural surfactants present in the heavy crude oil which would be activated using various additives known to be effective for such purpose, such as, for example, a buffer additive, one example of which is water soluble amines.

The tubing downhole water in oil emulsion formed by mixing of the production well stream and the tubing injection mixture downhole can be broken at any location at the surface or at a targeted desired final location. Special care should be taken with the tubing injection mixture carrier fluid to be used since it must be compatible with the production stream, such as to avoid multiple types of emulsions (water in oil in oil emulsions) which could be a serious risk for the flow of the oil in pipelines. It is optional but sometimes very desirable to break the emulsion and separate the production stream at a desired transitional location or between the wellhead and a very far away targeted location at the surface. By separating at the transitional location, the production water and the tubing injection mixture can be regenerated and reused as a carrier fluid for the reservoir mixture fluid, either for injection well and/or production well. For very long transportation needs a fresh water emulsion type could be formed in the transitional location. The fresh water emulsion can comprise a suitable surface aqueous solution and a surfactant and the desalted heavy and extra heavy oil.

According to the invention, the surface aqueous solution mixture is preferably an aqueous solution comprising a surfactant or a mixture of surfactants. The surface aqueous solution preferably contains surfactants selected from the group consisting of anionic surfactants, non-ionic surfactants, amphoteric surfactants and combinations thereof. The surface aqueous mixture surfactant is further preferably an ethoxylated alcohol having between 2 and 15 ethoxylated groups and an ethoxylated nonyl phenol having between 4 and 15 ethoxylated groups.

Suitable non-ionic surfactants include but are not limited to octilphenol having 9-15 EO, nonylphenol with an EO number from 4 to 15, preferably 15, fatty acids of 9-15 EO, n-tetradecanol of 9-15 EO, n-hexadecanol of 9-15 EO, laurate of sorbitan, and ethoxylated fatty alcohols with EO number from 4 to 20, preferably 9-15. Suitable tubing injection mixture ionic surfactants include but are not limited to n-alkyl sulfates of K or Na, n-alkyl trimethyl ammonium chloride and combinations thereof and petroleum sulphonates. The surface aqueous solution mixture could also be an aqueous solution comprising a natural heavy and extra heavy surfactant activator alone or in combination with other anionic or non-ionic surfactant or combinations of them.

Production from the production treated well can be conducted while monitoring pressure drawdown in the production well, and when the pressure drop increases, lowering the intake pump pressure, the formation area around the production well can be treated again in accordance with the present invention with the reservoir mixture. In the injection well, monitoring should be made to evaluate the reservoir mixture injection fluid front and the pattern of flow in the formation by using controlling/monitoring wells or tracers in the reservoir mixture injection fluid. Also the injection well should be selected from a location of the reservoir so as to allow distribution of the injected fluid in the surface of the porous media helped by the gravitational effect and density differential effects between the fluids. If the oil is of lower density than the water, the reservoir mixture injection well will be preferred to be located at the upper part of the reservoir.

The completion tubing can be of any material such as steel tubing, API grade type tubing or synthetic organic tubing. The gathering system can also be of any of the indicated pipe materials. Such as steel material, alloy material, plastic material, internal coated material and organic synthetic material.

Optionally, mechanical means such as a static mixer, and or mechanical mixer could be used for the mixing of the tubing injection mixture with the production well stream downhole and/or in the transitional location at the surface. Breaking the emulsions as formed in the present invention in the transitional or targeted location can be done by heating or other means. Following transport to the final location and breaking of the surface emulsion, the resulting surface aqueous phase can be pumped back to the production field, regenerated and used in whole or in part either as reservoir mixture carrier fluid, tubing injection mixture and most preferably for surface aqueous solution mixture in the transitional location as mentioned above.

For very long distance transportation needs and to allow a high degree of stability of the formed surface oil in water emulsions, the final water in oil emulsion can be a bimodal type emulsion, such that a small portion of the heavy and extra heavy oil can be in the final oil in water emulsion in the form of smaller droplet size distribution than the mean average droplet size of most of the droplet size of the rest of the heavy and extra heavy oil in the final oil in water emulsion.

Based upon the forgoing, in accordance with one preferred embodiment of the present invention, the transportation of heavy crude oil in the form of an emulsion can preferably be conducted by the following:
(a) breaking the long distance surface transportation oil in water emulsion in a desired final location of transportation of the heavy and extra heavy oil,
(b) pumping the aqueous solution back to the transitional location,
(c) regenerating the aqueous solution to a desired amount of concentration of surfactant,
(d) reusing the regenerated aqueous solution comprising water and a surfactant to form with the desalted oil phase a new batch of the oil in water emulsion,
(e) pumping the new batch of oil in water emulsion to the desired final location, and repeating the steps (a)-(e).

The typical formation for which the present invention can be utilized can be any formation wherein the forming of a water film over the pore surfaces would be beneficial to the overall hydrocarbon production from the formation. A particularly desirable application of the present invention is in formations having hydrocarbons with an API gravity of between 6 and 16, and even more preferably in formations containing hydrocarbons having an API gravity of between 6 and 12. These heavy and extra heavy hydrocarbon deposits in certain areas typically are very large in volume, but also contain asphaltenes as discussed above, and these are ideal candidates for treatment according to the present invention to enhance production. The typical rock formations containing such hydrocarbons have pore spaces which define the void volume which holds the hydrocarbons and which creates the permeability that allows the hydrocarbons to flow. The rock defining the pore surfaces of these formations are typically defined by quartz, feldspar, siliceous mineral, carbonaceous mineral, clays and combinations thereof.

FIG. 1 schematically illustrates a surface of a hydrocarbon bearing formation treated in accordance with the present invention. As seen in FIG. 1, a mineral surface 10 which defines the pore space of the formation has rock mineral active sites 12 along surface 10, and these rock mineral active sites 12 interact with hydrocarbons under the typical pressure in the formation such that chemically adsorbed hydrocarbons 14 are closely adhered to surface 10, particularly at rock mineral active sites 12.

According to the invention, the reservoir mixture surfactant/co-surfactant mixture of the present invention is introduced to the formation and held there in the presence of water so that a film of water is formed over the adsorbed hydrocarbons 14 as well as the rock mineral active sites 12 of mineral surface 10. FIG. 1 shows surfactant/co-surfactant mixture adsorbed in the form of water film 16 which is schematically illustrated as a double layer to represent the surfactant/co-surfactant mixture. This produces a water-wet condition at the surface, which enhances flow of hydrocarbon through flow areas and pore space defined by such a treated surface. The water which forms the film can be water already present in the rock formation fluids and/or from the carrier fluid if a water containing carrier fluid is used. The water salinity can be in the range between 800 ppm up to 45,000 ppm.

Pressure drawdown, or the pressure drop from the formation to the well bore, is a good measure of the flowability in the formation. When the pressure drawdown is relatively small, this indicates good flowing properties in the formation to the well. While producing from a well that has been treated according to the invention, it is desirable at the production well to monitor the pressure drawdown, and after a certain amount of oil has been produced from a treated production well, the pressure drawdown starts to increase. This increase in pressure drawdown indicates that the water film has been worn away or removed due to relatively high velocity flow of well fluids passing over the film to the well. Such flow can also make the water film uneven due to the tendency of the surfactant molecules adsorbed to diffuse and to push apart from each other as much as possible. This stream removes the water film by desorption of the surfactant and co-surfactant from the mineral surface and restoring the natural oil-wet initial condition at the mineral surface. At this stage, according to the invention, the production well can be treated again with the same formulation, and this process can be repeated as many times as necessary until no more hydrocarbon fluids flow to the well even after treatment or an economical limit is reached to abandon the well. With cyclic stimulation, the porous media will improve final recovery of the initial oil in place in the drainage area by cold production by potentially many times the amount of 3% typically reported as the well output obtained without stimulation.

In the injection well, as the injected fluid is continuously being injected to the formation; monitoring of the pressure drop is also suggested. The present invention reduces the time and need of costly thermal processes to reach a level of about 40% of additional initial oil in place recovery by cold methods which is a cheaper and safer recovery.

Figure 2:
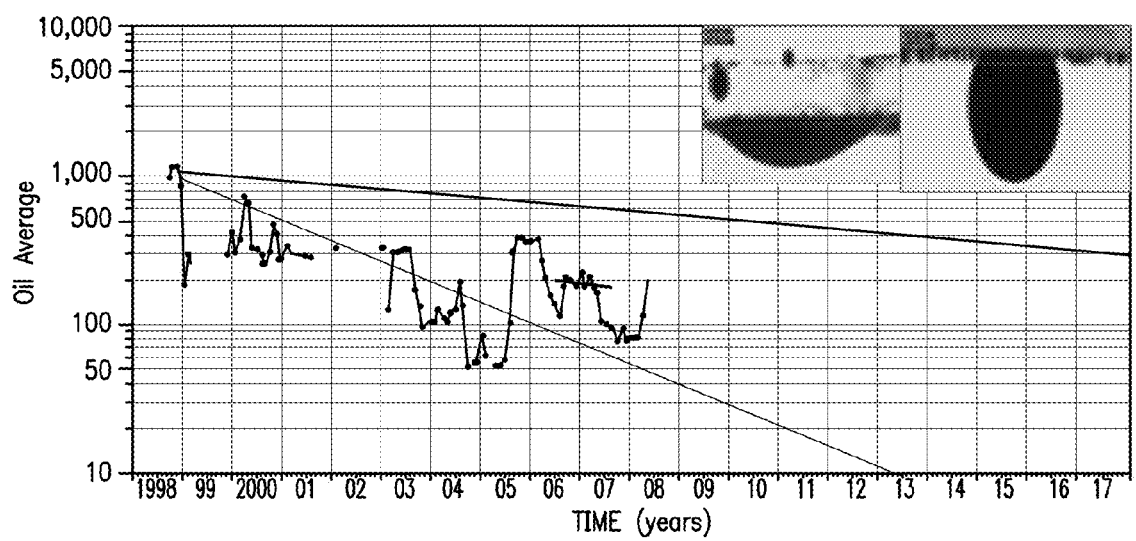
FIG. 2 illustrates typical and preferred flow rates from the hydrocarbon producing well.

FIG. 2 illustrates typical and desired flow rates from a hydrocarbon production well. The starts and stops shown in actual flow show a trend (line A) which is not desirable, while a preferred pressure behavior is shown at line B. The difference of the area between lines A and line B is an indication of greater recovery of oil from the same well in the same well drained area.

In the aforesaid discussion, the mixture of surfactant and co-surfactant in accordance with the present invention can advantageously be utilized in an injection and production method to even further enhance oil recovery from an oil field which utilizes such techniques.

Figure 6:
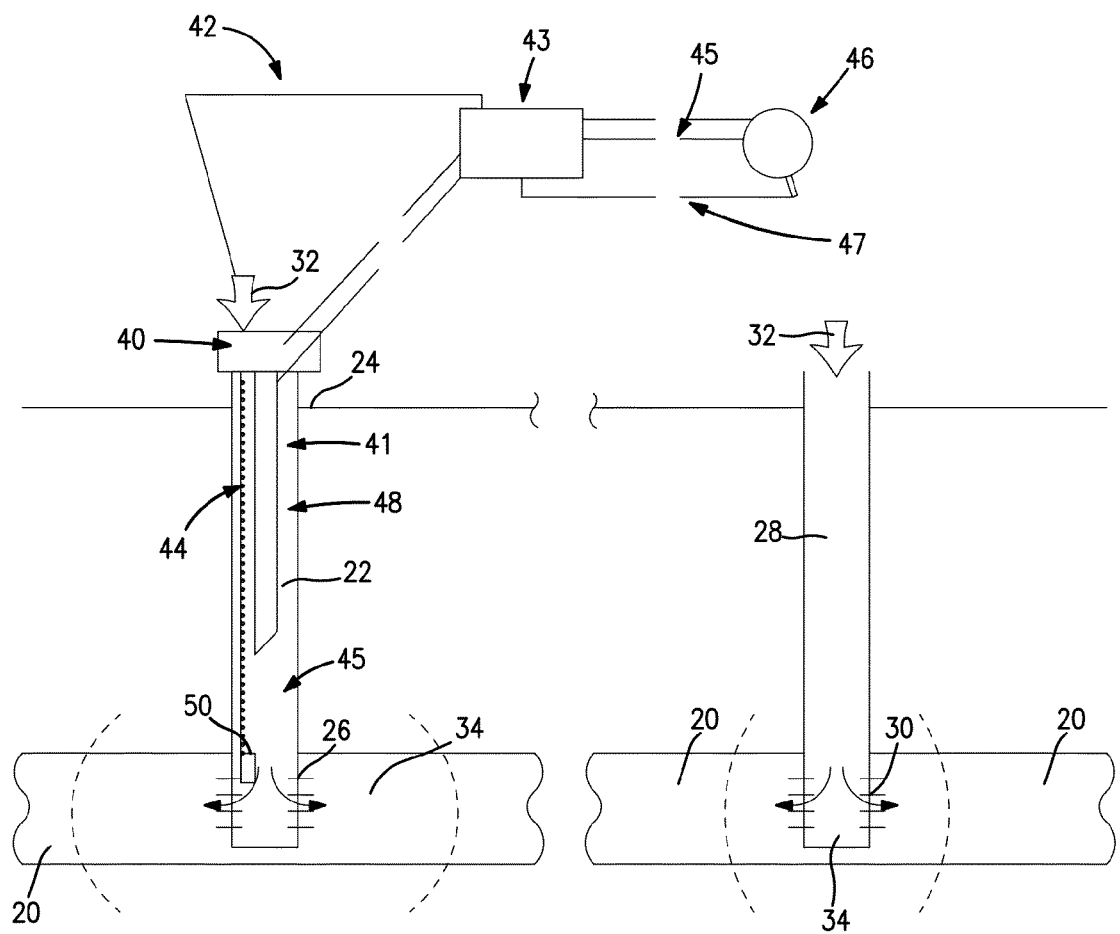
FIGS. 6 and 7 illustrate an injection, production and transport method in accordance with the present invention.

FIG. 6 shows a reservoir 20 which would typically be a hydrocarbon bearing formation including porous media, having pore space filled with various fluids, one of which is a heavy or extra-heavy hydrocarbon which may contain asphaltenes. It is desired to produce the hydrocarbon to the surface for upgrading and for further transportation and/or refining into various products. A production well 22 is shown extending from surface level 24 to formation 20, and having perforations 26 for allowing communication between well 22 and formation 20. An injection well 28 is similarly positioned from surface 24 to formation 20, and perforations 30 allow communication from well 28 to formation 20. In use, injection of driving fluids such as production water, water compatible with formation fluids, or brine as a reservoir mixture carrier fluid with the reservoir mixture surfactant and co-surfactant of the present invention into injection well 28 is used to drive fluids toward production well 22. This forms a water film over the natural adsorbed hydrocarbons (such as asphaltenes on the mineral surface of the rock) and allows mobilization of oil which was immobile due to affinity of such oil with the natural oil wet condition of the surface of the porous media. The mobilized oil is driven to the production well 22 and therefore fluid recovery through production well 22 is enhanced. In accordance with the present invention, the reservoir mixture of surfactant and co-surfactant as discussed above can advantageously be used in a method such as discussed herein.

In such a method, it is advantageous to form a water film over the surfaces of porous media and adhered hydrocarbons in the vicinity of both the production well 22 and in the largest possible area of the reservoir that can be contacted with the reservoir mixture injection fluids through the injection well 28. This can help to provide better flow and mobilization of the immobile oil in the porous media by reducing or eliminating the affinity of the oil to the natural oil wet surface when the new water wet condition is reached by contact of the reservoir mixture surfactant and co-surfactant of the present invention to form a water film as described above. Flow into the formation through well 28 as well as out of formation 20 into production well 22 is enhanced. Thus, a reservoir mixture of surfactants/co-surfactants as discussed above can be prepared and pumped into each of wells 22, 28 as schematically illustrated by arrows 32 in FIG. 6.

This pumping positions the mixture through wells 22, 28 and into the zones 34, schematically illustrated by dashed lines in formation 20. The reservoir mixture injection of fluid through injection well 28 can be continued as long as desired after injection breakthrough in well 22. At this time, a decision should be made to continue to use well 28 as an injection well or to convert well 28 into a new production well and to locate a new injection well in formation 20 in communication with each of wells 22 and 28. As a production well, well 28 can be monitored for cyclic stimulation of the vicinity of the well as described for the production well 22.

After being pumped or naturally injected to formation 22 through injection well 28, this reservoir mixture is then held in position for a time sufficient to form a water film over the surfaces of porous media and also over adhered hydrocarbons as desired. In the case of the production well 22, when treatment is completed, the mixture can be pumped from the production well, and then well 22 (or other productions wells not shown including wells which had been injection wells 28) can be returned to production while continuously injecting the injection fluid through well 28. Once the production stream coming from perforations 26 is downhole in the well 22, it is lifted to surface by means of a tubing 41 by natural flow or by means of a pump (not shown). Tubing injection mixture is pumped downhole from the wellhead 40 or from the surface line 42 coming from an optional transitional flow location 43. Capillary tubing 44 or an additional annular space (not shown) to allow communication from wellhead 40 to perforations 26 can be used in the cyclic injection of the reservoir injection mixture to the production well from wellhead 40 through perforations 26 to zone 34 in the formation.

In the transitional location 43 at surface, it is possible to break the downhole formed emulsion of reservoir production stream and tubing injection mixture. Different locations can be used downhole for the mixing of the production stream and the tubing injecting mixture. Also, different means can be used for helping the mixing of both streams downhole. For example, static mixers or conventional pumps can be used, as schematically illustrated at 50.

In the transitional location 43, heavy and extra heavy oil phase can be split from the production mix water phase and the oil phase can be desalted. The desalted oil phase can further be used for the formation of a fresh surface water oil in water emulsion to be transported through line 45 to target final location 46. At location 46 it is desirable to separate the oil phase from the fresh water phase. The oil phase, having been transported to the desired target location, can now be upgraded or refined as desired. The fresh water phase can be pumped back to the transitional location 43 through line 47 and regenerated at the transitional location 43 to be reused in the formation of a new batch of fresh water oil in water emulsion in the transitional location 43 for further transport of a new batch of desalted heavy and extra heavy oil to the target location 46.

Figure 7:
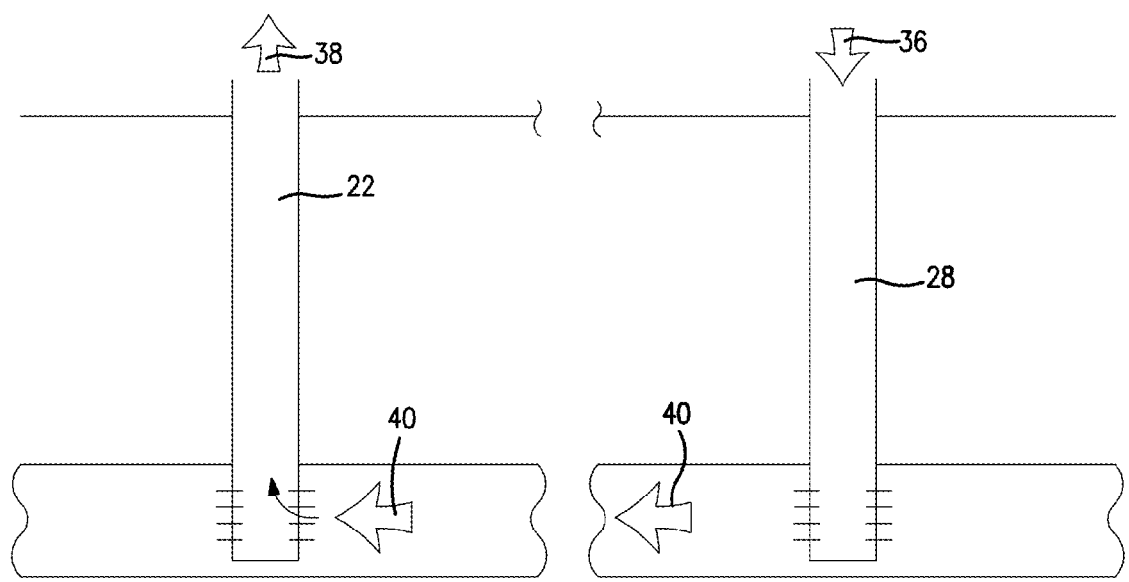

FIG. 7 shows the operation mode, and schematically illustrates injection of fluids 36 into well 28, and production of fluids 38 from production well 22. The enhanced flow of subterranean fluids from the vicinity of injection well 28 toward the vicinity of production well 22 is also schematically illustrated by arrows 40 shown in formation 20. The enhanced flow conditions around the perforations of well 22 create enhanced flow into production well 22 as desired, with a lower pressure drop and improved productivity. Reduced pressure drop in the vicinity of well 22 helps to reduce the rapid breakthrough of the injection fluid 36 to well 22, and also provides for better and more uniform flow through the areas between injection well 28 and into production well 22, with reduced risk of "channeling" and increased mobilization of the immobile oil, breaking its affinity with the natural oil wet condition of the rock surface, where injected fluid modifies the surface to a water wet condition. Then, the path of flow of the injection fluid changes to a not contacted oil wet surface and the contact of this surface area with the surfactant and co-surfactant mixture changes it to a water wet state, mobilizing immobile oil to flow through a new water wet surface to the producing well 22 until an economical rate of production can no longer be reached, at which time the method may be abandoned.

As with the embodiment discussed above, this process can be carried out while pressure at relevant locations is monitored, and when the pressure drops and production rates reach certain levels, the treatment with surfactant and co-surfactant according to the invention can again be conducted. The process can be carried out in vertical wells, deviated wells, horizontal and multilateral wells. Also, after breakthrough of the reservoir mixture injected fluid in the production well, production water can be separated from the produced stream, recycled back as reservoir mixture injection carrier fluid through the injection well after regeneration to the appropriate values of concentration of the reservoir mixture surfactant and co-surfactant in the carrier fluid according to the invention, thereby lowering the amount of chemical substances required to prepare the injection fluid.

The following example further illustrates the invention and the results which are obtained using same.

EXAMPLE 1

Crude oil and water from several wells in different areas of the Orinoco River Belt fields were collected. The oil and water were placed in closed glass vessels at several oil and water saturations, at reservoir conditions of water salinity and temperature, in a thermally controlled oven. Inside each vessel was placed a small glass plate which was monitored for wettability conditions starting with a water-wet condition and further being naturally changed to oil wet after a medium time period of about three to four weeks at reservoir temperature of 145° F. For each glass plate, wettability was measured by contact angle measurement techniques at the well temperature ranging from water-wet at the initial condition to oil wet after three weeks of aging process in the vessels at reservoir conditions.

Figure 3:
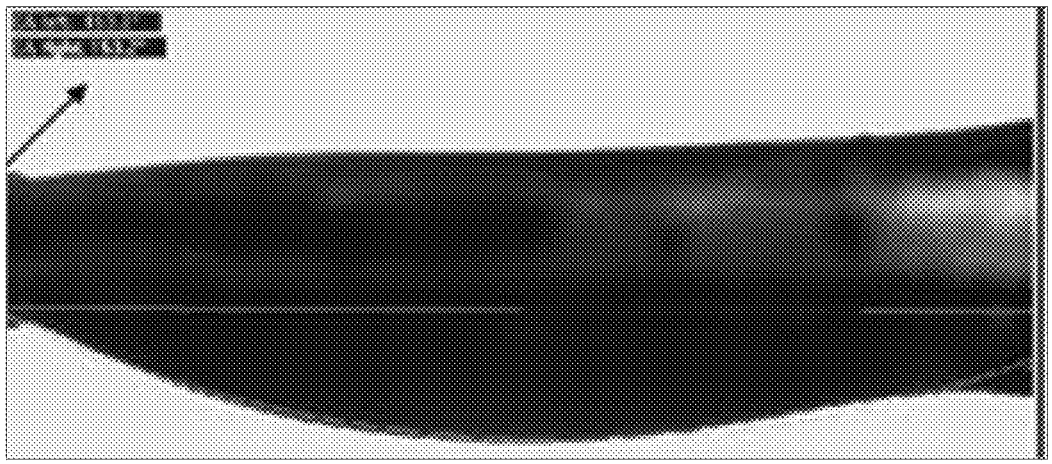
FIGS. 3 and 4 illustrate a test glass plate which is oil-wet in FIG. 3, and which has been treated in accordance with the present invention in FIG. 4.

After this treatment, the glass plates had a contact angle with oil which shows a strongly oil-wet condition as can be seen in FIG. 3, which shows the oil spreading over the plate surface.

Figure 4:
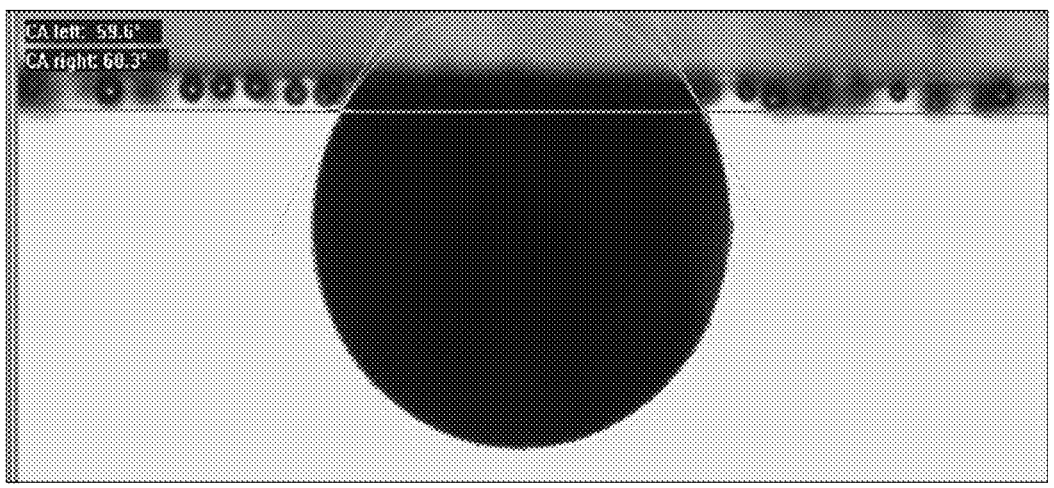

Each plate was then placed in a beaker for a soaking time with a mixture of equal amount of the well fluids in a mean average of 20% formation water and 82% extra heavy oil at 145° F. temperature, with the formulation of the present invention, which in this particular example comprised a solution of 0.5% volume of ethoxylated nonyl phenol with 30 ethoxylated groups and 0.5% volume of ethanol, both admixed with 99% of production water from the Cabrutica field of the Junin Division of The Orinoco River Belt. The mixture and the plate were held for an 8 hour exposure time at reservoir temperature of 145° F. and contact angle measurement showed wettability reversal from oil wet as shown in FIG. 3 to water wet as shown in FIG. 4. Note the bubbling up of the oil, and contact angle clearly indicative of the now water wet surface.

Similar results can be obtained by using various non-ionic and ionic surfactants. Suitable non-ionic surfactants include but are not limited to octilphenol having 9-16 EO, nonylphenol with an EO number from 4 to 55, preferably 20-60, fatty acids of 9-20 EO, n-tetradecanol of 9-20 EO, n-hexadecanol of 9-20 EO, laurate of sorbitan, and polyethoxylated fatty alcohols with EO number from 4 to 25, preferably 9-20.

Figure 5:
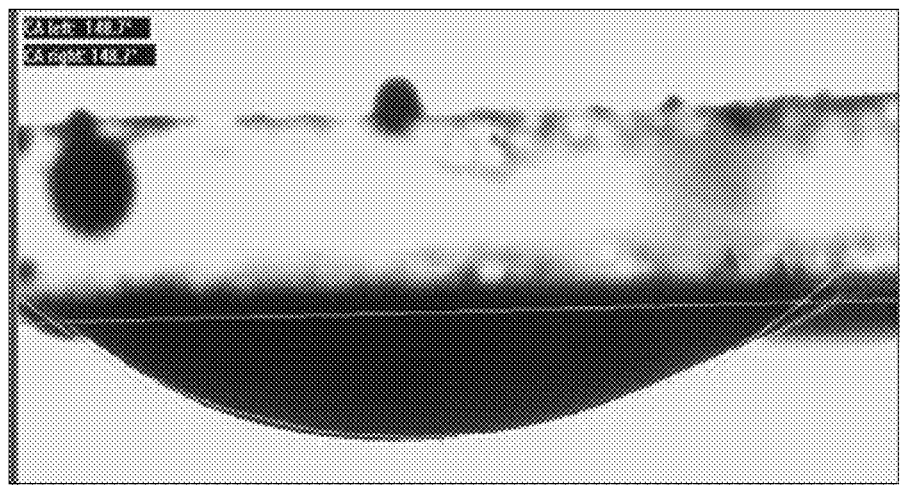
FIG. 5 shows the test plate is still oil-wet even after solvent cleaning.

The aged glass plates were then soaked with a solution of mutual solvent for more than twenty four (24) hours to remove the water film and any visible hydrocarbon. The cleaned glass plates showed a clear and clean surface, but when a drop of water was placed on the plate, the water drop did not spread on the surface. The contact angle was measured and the plate still exhibited an oil-wet condition, as shown in FIG. 5.

This indicates that even though the mineral surface, such as sandstone, feldspar, clays or the like can be cleaned of adhered hydrocarbons still on that surface, there remains a chemically adsorbed film of hydrocarbon and therefore on such a mineral surface there exists a strong oil-wet wettability. As mentioned previously, the oil-wet wettability is the most adverse condition for the recovery of oil in a porous media. Thus, even by undertaking the cost and steps of removing the adhered asphaltenes, the resulting cleaned surface remains oil wet.

Use of the formulation and method of the present invention creates a water film on the mineral surface, covering the previously chemically adsorbed hydrocarbons. This film creates an interface that will conduct hydrocarbon flow for very long periods of time between stimulation cycles in the production well, and allows mobilization of oil which is immobile due to its affinity to the natural oil wet condition of the rock when the water film is formed in the porous media through injection from the injection well. A very low pressure drawdown is achieved with the increased oil flow rates in the production well and very low pressure drop occurs in the injection well so as to make the injection by natural flow, thereby providing great benefits to the productivity and final recovery of oil from the drained area of the well and the whole reservoir.

EXAMPLE 2

A laboratory test was conducted for evaluating relative permeability with extra heavy crude oil and formation water and INTESURF™ 3PW0.5 solution prepared according to the invention with production water from the Cabrutica field of the Junin Division of the Orinoco River Belt Basin in Venezuela, and using a core of well E20P15 and formation fluids of well DE 22 12 of the same field.

The core from a depth of 2212.2 feet from Cabrutica field was taken, and two samples were packed for use in a confined cell, one sample for return permeability testing and the other sample for relative permeability testing of extra heavy oil and formation water and extra heavy oil and INTESURF 3PW0.5 solution. The samples were cleaned, restored and aged for 16 days at the reservoir temperature of 120° F. and pressure of 400 psi in a confined cell. An imbibition Amott test was performed to both samples to insure an oil wet condition of the sample before the tests. The core properties for two samples are shown in Table 1.

Return Permeability Test

Core sample 1A with an oil wet condition confirmed by the imbibition Amott test was placed in the confined cell at 1300 psi confining pressure. Thereafter extra heavy live crude oil from well DE 22 12 of Cabrutica field was displaced until a constant pressure drop was achieved. The permeability to oil (Ko) at the initial water saturation was measured and this value was taken as the reference base relative permeability to oil in the sample. Three cycles of returned permeability test were made, and previous to each cycle, 10% of the porous volume of the sample was squeezed with the INTESURF™ 3PW0.5 solution into the production end of the core sample, and the same volume allowed to be discharged from the opposite end of the core sample. A soaking time of 24 hours was allowed to each cycle before the displacement of live

TABLE 1

COMPANY INTEVEP S.A
CORE FROM WELL E20P15 CABRUTICA FIELD VENEZUELA

| Sample # | Confining pressure PSI | Weigth Total | Long | Diam | Vol. grain | Vol Pore space | Density grain | Ø | Vol Total | PERMEABILITY Air | Klink. |
|---|---|---|---|---|---|---|---|---|---|---|---|
| 1A | 1300 | 86.03 | 4.875 | 3.595 | 30.67 | 17.42 | 2.632 | 36.2 | 48.09 | 2697 | 2605 |
| 2B | 1300 | 96.42 | 5.143 | 3.702 | 34.42 | 19.22 | 2.628 | 35.8 | 53.64 | 2596 | 2507 |

Figure 8:
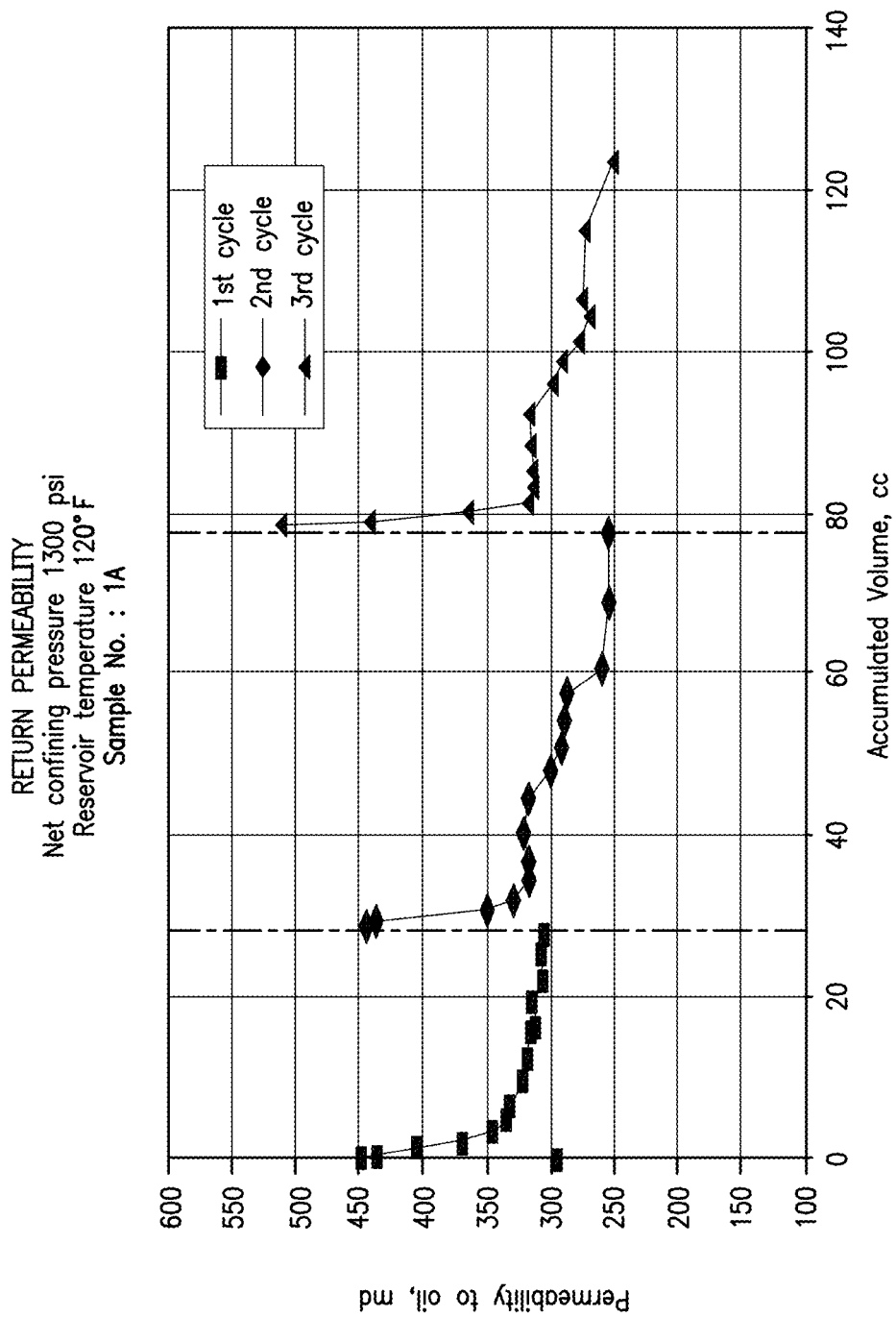
FIG. 8 illustrates results of use of the present invention in the form of a return permeability test with several treatments cycles in accordance with the present invention.

INTESURF 3PW0.5 solution is a mixture of 99% V/V production water from the Cabrutica field and a 0.5 V/V of nonylphenol ethoxylated with 30 ET groups, and 0.5 V/V % methanol. 1 lb/bbl of potassium acetate is added for clay control to the final admixture.

crude oil was restarted. The rate of flow and the pressure drop was monitored and the permeability to oil at several points of porous volume displaced was measured. FIG. 8 exhibits the return permeability test results for each cycle and Table 2 the values from the test obtained.

TABLE 2

RETURN PERMEABILITY
Net confining presure 1300 psi
Reservoir temperature 120° F.

Company: INTEVEP  
Well: E20-P15  
Field: Cabrutica  
(Intesurf Plus.)  
Stimulation fluid: INTESURF 3 PW 0.5  
INTESURF Carrier fluid: Production water  
Squeezed stimulation fluid: 10% porous volume Sample No. 1A  
Depth 2212.2 ft  
Porosity 0.354 fraction  
K Kklinkemberg 2295 md  
(Ko) K to oil 294 md

| 1 er cycle Vol. Acum., cc | 2 do cycle Vol. Acum., cc | 3 er cycle Vol. Acum., cc | 1 er cycle K to oil, md | 2 do cycle K to oil, md | 3 er cycle K to oil, md | Skin factor SF = 1-K/Ko |
|---|---|---|---|---|---|---|
| 0.19 | 28.58 | 78.58 | 448 | 444 | 511 | −0.737 |
| 0.35 | 29.61 | 79.08 | 436 | 437 | 442 | −0.502 |
| 1.14 | 30.93 | 80.37 | 405 | 350 | 366 | −0.243 |
| 2.30 | 32.28 | 81.51 | 369 | 328 | 318 | −0.081 |
| 3.38 | 34.45 | 83.43 | 344 | 318 | 315 | −0.069 |
| 4.93 | 36.48 | 85.30 | 334 | 317 | 315 | −0.070 |
| 6.48 | 40.02 | 88.41 | 331 | 321 | 316 | −0.074 |
| 9.68 | 44.38 | 92.16 | 322 | 318 | 318 | −0.081 |
| 12.45 | 47.67 | 95.64 | 318 | 301 | 299 | −0.017 |
| 15.60 | 50.97 | 98.39 | 316 | 292 | 293 | 0.004 |
| 16.50 | 54.22 | 101.42 | 311 | 290 | 278 | 0.054 |
| 19.50 | 57.39 | 104.21 | 314 | 287 | 271 | 0.080 |
| 22.39 | 60.42 | 106.78 | 306 | 260 | 276 | 0.063 |
| 25.36 | 69.24 | 115.14 | 307 | 254 | 274 | 0.069 |
| 28.13 | 77.50 | 123.55 | 304 | 255 | 252 | 0.143 |

A stimulation state was found in all cycles suggesting the cyclic stimulation of the sandstone—production end zone as a productivity improvement of the well by reducing the pressure drop and increasing the production of extra heavy oil from the well. No formation damage was observed even after a large amount relative to porous volume of live extra heavy oil was displaced and desorption of the surfactants of Intesurf in the porous media occurs. After restimulation with the Intesurf solution, a better condition of relative permeability to oil is achieved. It is believed that the relative permeability to oil lost after a great volume of displacement of oil and after several cycles of squeezes is due to the new water saturation without Intesurf base surfactant increases in the porous media. However, it is observed that once the surfactant is available by restimulation in the porous media, a new improvement of the oil relative permeability is achieved and even reaches levels higher than earlier cycles.

A relative permeability test of extra heavy oil and formation water and extra heavy oil and INTESURF 3PW0.5 solution with production water was then conducted.

Core sample 2B was insured to have an oil wet condition by Amott imbibition test and thereafter was placed in a confined cell at confine pressure of 1300 psi. Temperature was that of the reservoir of 120° F. Extra heavy oil was displaced at a pressure of 1000 psi until a constant flow was achieved. The relative permeability effective to oil was measured at the initial water saturation. Thereafter, formation water was displaced at a constant rate of 1 cc/min and monitoring of the produced fluids and pressure drop was made until no flow of extra heavy oil is observed. The effective water permeability at the residual oil saturation is measured for each sample and the volume of extra heavy oil produced at room conditions is corrected to reservoir conditions using the viscosity and volumetric factor of the reservoir. The final saturation of the fluids is determined by material balance. The effective permeability of each phase is calculated using Darcy's Law. The relative permeability water—extra heavy oil and Intesurf solution—extra heavy oil ratios at non-stable state were calculated using the methods of Jones and Roszelle.

Figure 9:
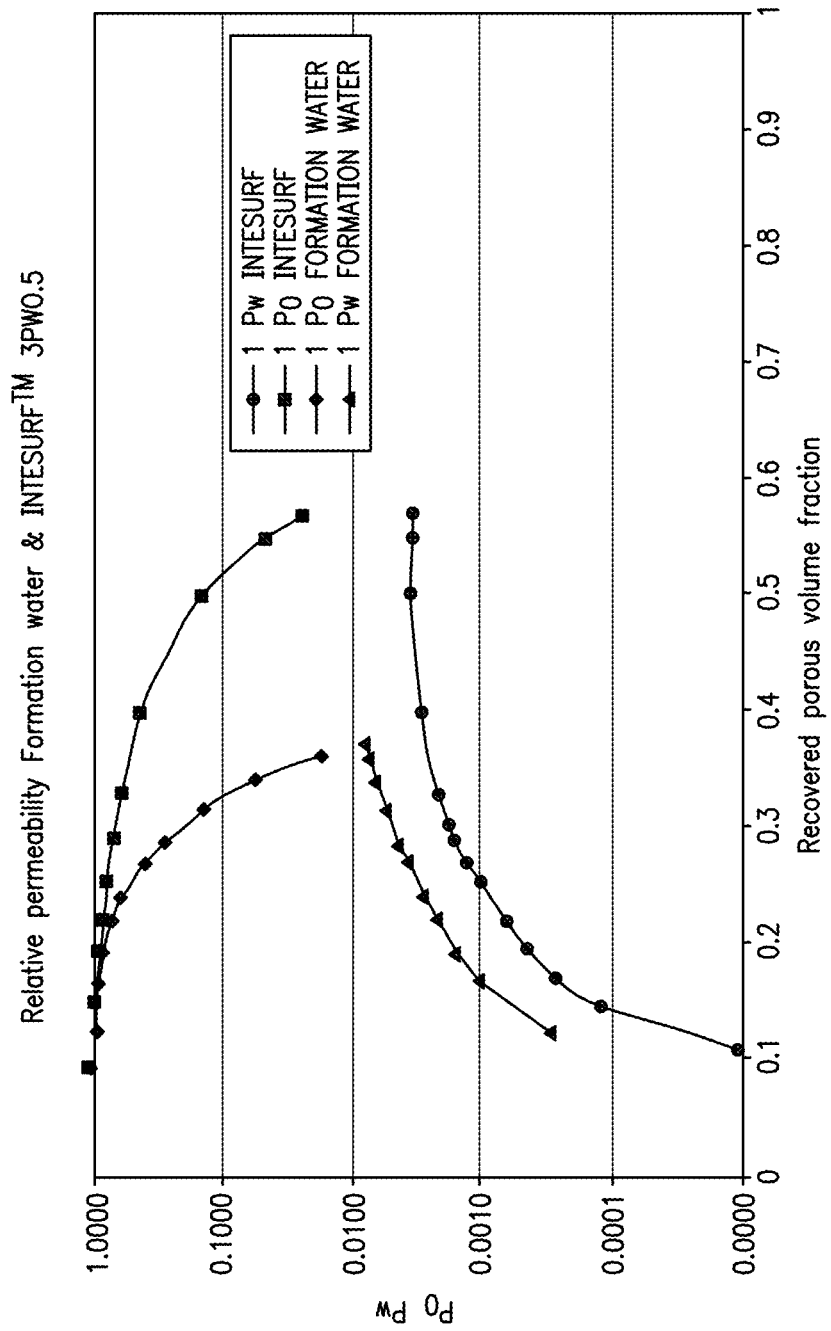
FIG. 9 further illustrates a relative permeability curve for formation water and for production water with surfactant and co-surfactant of the present invention.
Figure 10:
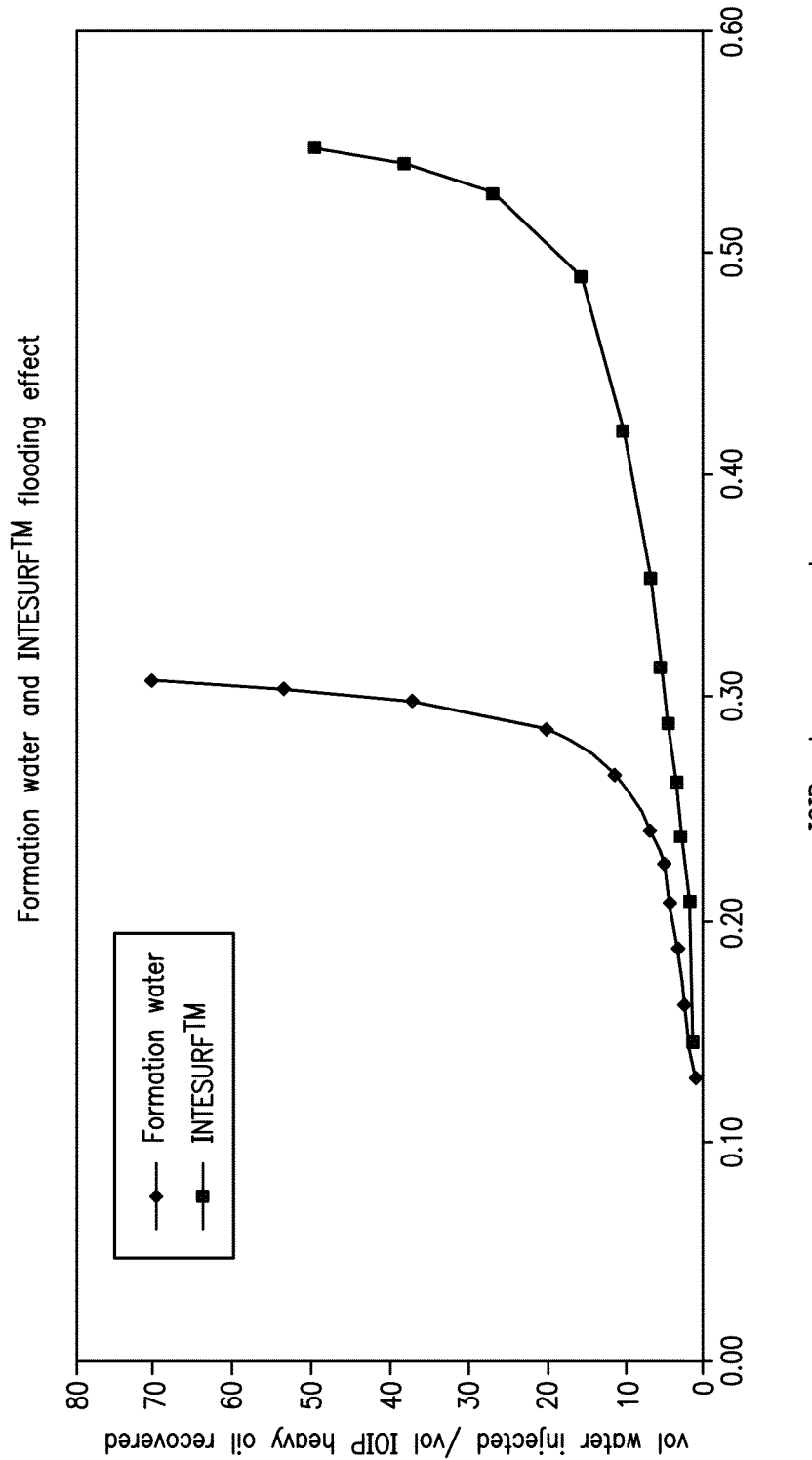
FIG. 10 illustrates the relation of volume of produced water with INTESURF required to a volume of recovery of the IOIP for the test done.

Once the formation water—extra heavy oil test was run extra heavy crude was displaced for the core sample until a condition of initial water saturation and extra heavy oil saturation was achieved. In this state the permeability effective to oil was measured and displacement with the solution of INTESURF™ 3 PW0.5 took place with a rate 0.1 cc/min for 8 hours allowing a soaking time of 12 hours and so on until only solution of INTESURF™ 3 PW0.5 was collected as the production without any extra heavy oil. The final recovery of extra heavy oil was 10.02 cc which is a 52.13% of the total porous volume and 57.89% of the original extra heavy oil in place. FIG. 9 exhibits the behavior of Ko and Kw vs. the water saturation for the two testing fluids and FIG. 10 exhibits the ratio of the quantity of production water with the surfactant and co-surfactant used as the injected fluid to the quantity of recovered oil of the initial oil in place recovered from the plug of the core sample. From the figure, it can be observed that 14% of the initial oil in place (IOIP) can be recovered using a mean relation of 1 unit of oil produced by 1.6 volume of mixture of surfactant and co-surfactant and produced water injected. Also an additional 20% recovery of the (IOIP) can be recovered using a mean relation of 1 unit of oil in place produced by each 3.2 volume of mixture of surfactant and co-surfactant and carrier fluid injected after the first 14% of initial IOIP recovered.

EXAMPLE 3

Figure 13:
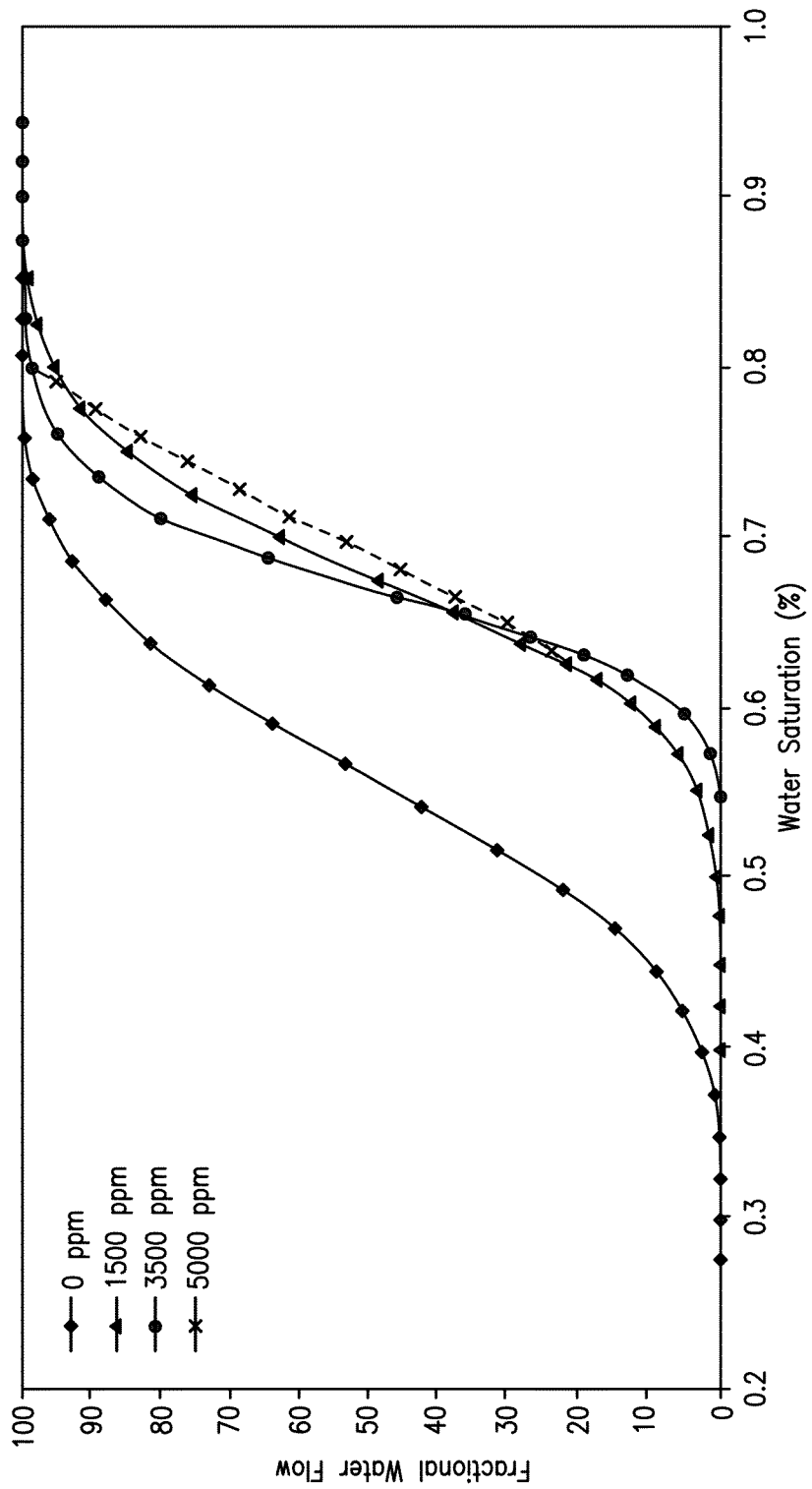
FIG. 13 shows the fractional flow of water vs. the water saturation with sensitivity to reservoir mixture surfactant and co-surfactant concentration for a core plug flow of an extra heavy Orinoco River reservoir oil.

A set of core flow tests were run for relative permeability measurements as shown and described in example 2. Calculations of the K relative to oil ($K_o$) and K relative to water ($K_w$) with formation water and with three different concentrations of the Intesurf™ formulation as disclosed in the present invention were done. The formulations were prepared with the production water of the Cabrutica field of the Junin Division of The Orinoco River Belt basin. The surfactant was nonylphenol ethoxylated of 30 EOE and the co surfactant used was methanol. The concentration at 1:1 vv was of 0.5% of each component. During all tests performed with the INTESURF formulation the total injection fluid was injected by several batch with a soaking time of at least a week during the injection of a batches of the injection fluid and another batch to restart flow. With the calculated data a fractional flow of water as a function of the water saturation was calculated for each test of relative permeability test and shown in the graph of FIG. 13. FIG. 13 shows the exceptional beneficial effect of the treatment of the porous media with INTESURF™ in the flow pattern and the final oil recovered of the initial oil in place

EXAMPLE 4

The well CD 1405 from the Cabrutica field in the Junin Division of the Orinoco River Belt was selected for a pilot test for stimulation and cyclic re-stimulation with the composition and method of the present invention for a production well.

Figure 11:
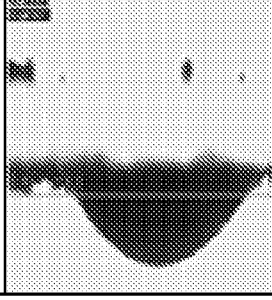
FIG. 11 illustrates a test glass plate after the plate is treated with the formulation and after treatment and 24 hours soaking time with fluids of the well CD 1405.
Figure 11:
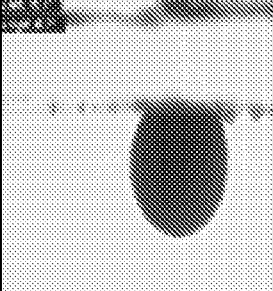

Crude oil and formation water from well CD1405 were collected as well as production water from disposal tank 903 from the principal station of Cabrutica field in the Orinoco River Belt field. The characteristics of the crude oil and formation water are:

Oil:
Saturated %: 8 wt
Aromatics %: 44 wt
Resins %: 35 wt
Asphaltenes %: 13 wt
Acidity: 3.90 mg KOH/g
Viscosity CP 10,420 at 145 F
API: 9%
C wt 84.55
H wt 11.12
Formation Water with 2,500 ppm NaCl The oil and formation water were placed in closed glass vessels at 20% vol. saturation of formation water and 80% vol. of oil saturation, at reservoir conditions of temperature of 145° F., in a thermally controlled oven. Inside each vessel was placed a small glass plate which was monitored for wettability conditions starting with a water-wet condition and further being naturally changed to oil wet after a time period of aging of three weeks at reservoir temperature of 145° F. For the glass plate, wettability was measured by contact angle measurement techniques at the well temperature ranging from water-wet at the initial condition to oil wet after three weeks of the aging process in the vessels at reservoir conditions as shown in FIG. 11, indicating contact angle of 137.5° at the aged condition. This is as it would be found in the reservoir, showing oil spreading over the plate surface.

The plate was then placed in a beaker for a soaking time with a mixture of equal amounts of the well fluids in a mean average of 20% vol. formation water and 80% vol. of the 9° API extra heavy oil at 145° F. temperature, with the formulation of the present invention, which in this particular example comprised a solution of 0.5% vol. of ethoxylated nonyl phenol with 30 ethoxylated groups and 0.5% vol. of ethanol, both admixed with 99% vol. of production water from the disposal tank of the Cabrutica field of the Junin Division of The Orinoco River Belt. 1 lb/bbl of potassium acetate was added to the formulation for clay control. The mixture and the plate were held for a 24 hour exposure time at reservoir temperature of 145° F., and contact angle measurement showed wettability reversal from oil wet of 137.5° to water wet with a contact angle of 45.1°. Bubbling up of the oil and measured contact angle were clearly indicative of a now water wet surface.

This test confirms the wettability change in the well after application of the invention treatment to the porous media.

EXAMPLE 5

A first stimulation job was prepared for the well CD 1405, including injecting through the annular space between the casing and the production tube, 350 barrels of the formulation of the present invention in an oil based carrier fluid. The injection fluid was prepared with 3.5 barrel of ethoxylated tridecanol of 17 ethoxylated oxide groups, 3.5 barrels of methanol and 343 barrels of gasoil. The fluid was pumped with a pumping truck. A soaking time of 24 hours was allowed in the well, and production restarted. Production increase was from a mean value before of 183 bopd (barrels oil per day) to a mean of 445 bopd after the treatment.

After a period of an eight month after the first stimulation job, a new re-stimulation job was executed to the well, but now a water based injection fluid was prepared. Another amount of 350 barrels of the injecting fluid was pumped by the annular space between the casing and the production tube to the formation pore space using potable water from a water well based carrier fluid. The injection fluid was prepared with 3.5 barrel of ethoxylated nonylphenol of 20 ethoxylated oxide groups, 3.5 barrels of methanol and 343 barrels of water. The fluid was pumped with a pumping truck. A soaking time of 24 hours was allowed to the well, and production was then restarted. Production increase was from a mean value of 183 bopd to a mean of 358 bopd.

Table 3 shows the CD1405 reservoir and completion well parameters for the CD 1405 well.

TABLE 3

WELL CD 1405 RESERVOIR INFORMATION

| | | | | |
|---|---|---|---|---|
| Reservoir | | OFINF SDZ-2X A1 | | |
| Sand | | 2C | | |
| Horizontal side length (MD), ft | 5150' | Tope 2,710 ft | Base | 7,860 ft |
| Permeability, md | | 8,900 | | |
| Porosity, % | | 32 | | |
| Temperature, ° F. | | 126 | | |
| Crude oil gravity, ° API | | 9 | | |
| Actual Pressure, psi | | 420 | | |
| Well drilling date | | Jul. 2, 2009 | | |
| Production Method | | Progressive cavity pump | | |
| Type of well | | Horizontal | | |

EXAMPLE 6

Two highly deviated Orinoco River Belt wells (CD36 and CD37) from the Cerro Negro area of the Carabobo Division of the Orinoco River Belt basin were selected for pilot testing using oleic base formulation. Main characteristics of the wells are:

| Well name | Reservoir name | Completion Date | Porosity % | K Darcy | Vsh | Thickness ft | Production Method | Original preasure psi | Actual pressure psi | Lithology |
|---|---|---|---|---|---|---|---|---|---|---|
| CD 36 | OFIM CNX9 | March 1992 | 33 | 2.3 | 5.3 | 194 | Mechanical pump & Gravel pack | 1100 | 1095 | sandstone |
| CD 37 | OFIN CNX9 | February 1993 | 32 | 5 | 7.0 | 192 | PCP Gravel pack | 1350 | 1000 | sandstone |

An amount of 270 barrels of diluent, which is a light crude oil of 23 API oil gravity, was admixed with a previously homogenized mix of 1.3 barrels of tridecyl alcohol of 12 EO groups and 1.3 barrels of methanol in a tank of a pumping truck. The admixture was recirculated in the tank for homogenization and pumped to well CD 36 through the annular space between the tubing and the casing. The stimulation fluid contacted the gravel pack downhole and passed to about two feet penetration in the formation. The well was closed for a soaking period of 24 hours. The well was restarted thereafter and showed an increased production of about 200 bpd that has been stable for a period of 60 days.

Another amount of 133 barrels of diluent, a light crude oil of 23 API gravity was admixed with a previously homogenized mix of 0.7 barrels of tridecyl alcohol of 12 EO groups and 0.7 barrels of methanol in a tank of a pumping truck. The admixture was recirculated in the tank for homogenization and pumped to well CD 37 through the annular space between the tubing and the casing. The stimulation fluid contacted the gravel pack downhole and passed to about two inches of penetration in the formation. The well was closed for a soaking period of 24 hours. The well was restarted thereafter and showed a production of 80 barrels net of oil per day and has been stable for a period of 60 days thereafter. The net oil production before the stimulation was 24 barrels of net oil.

These pilot tests establish that the stimulation fluid, or formulation, of the present invention is highly effective at improving hydrocarbon flow and production through porous media treated with the fluid. The fluid is made from readily available constituents, and the method can be carried out using known equipment already available for injecting other well stimulation fluids.

Figure 12:
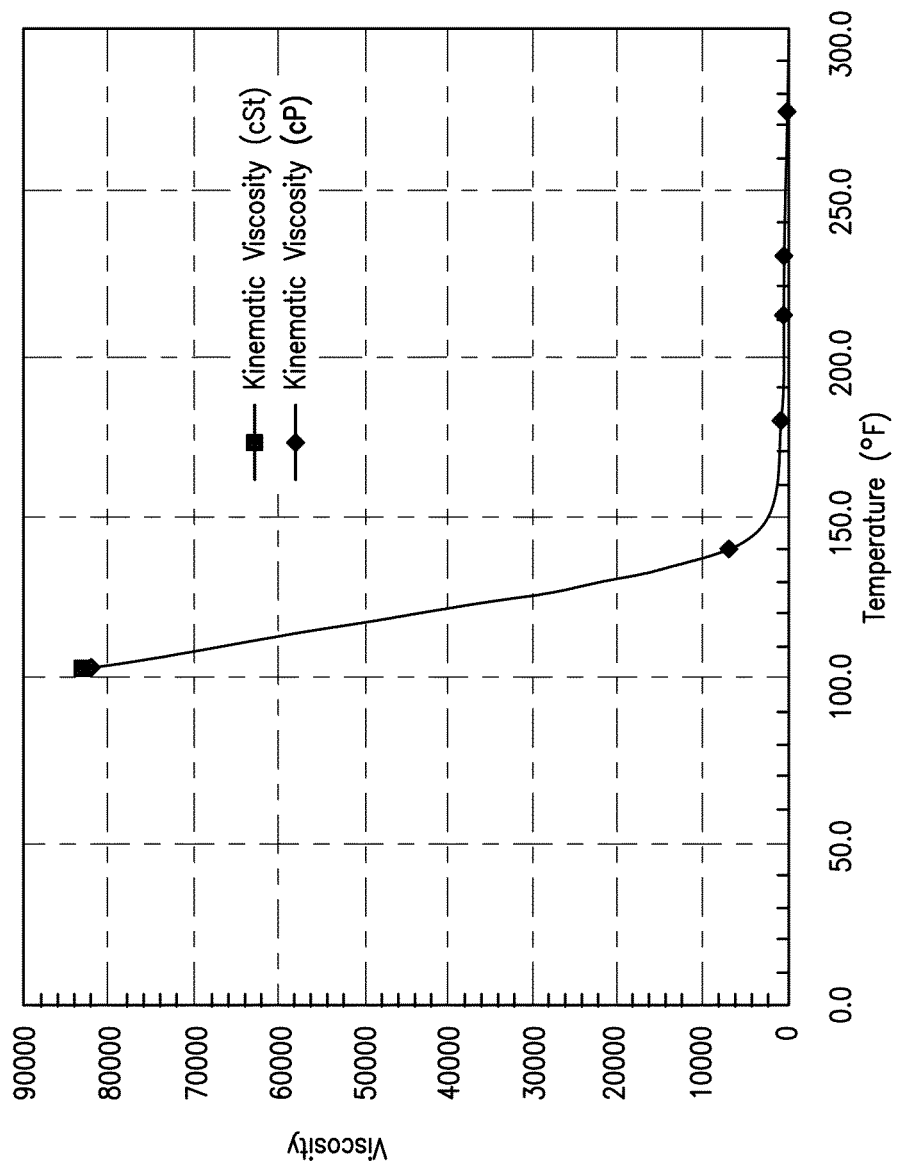
FIG. 12 shows a viscosity vs. temperature relationship for typical heavy and extra heavy oil.

As mentioned above, typical heavy and extra heavy crude oils for which the invention is ideal have a viscosity which can be managed at reservoir temperatures, but this viscosity increases dramatically at cooler temperatures such as those encountered in surface conditions. A typical relationship of FIG. 12 illustrates viscosity to temperature for an extra heavy crude oil.

Also, FIG. 13, shows the exceptional beneficial effect of the treatment with INTESURF™ of the porous media in the flow pattern and final recovery of the initial oil in place with three different concentrations of the formulation of the present invention as compared with the formation water alone Based upon the foregoing, a beneficial change in permeability, production levels and recovery of the initial oil in place is demonstrated by using the formulation and method of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. A combined injection, production and transportation method, comprising the steps of:
   establishing a production well and an injection well into a hydrocarbon-bearing formation and a surface flow line system for carrying a production stream from the production well;
   introducing a mixture of a surfactant, a co-surfactant and a carrier fluid into each of the production well and the injection well so that the mixture flows into porous media surrounding the production well and the injection well;
   holding the mixture in the porous media surrounding the production well in the presence of water for a period of time sufficient to form a water film on surfaces of the porous media surrounding the production well;
   injecting an injection fluid into the injection well while producing from the production well, whereby hydrocarbons flow from the porous media around the injection well toward the production well;
   introducing an injection mixture of a surfactant and a carrier fluid downhole into a desired point in a production tubing of the production well so that the injection mixture mixes with the production stream to form an emulsion;
   producing the emulsion through the tubing to the surface flow line to a desired distance away from the production well, whereby drag forces in the system are reduced from downhole through the surface flow line to a desired location at the surface.

2. The method of claim 1, wherein the surfaces of the porous media prior to treatment with the mixture have hydrocarbons adhered to them, and wherein the water film is formed over the surfaces and the hydrocarbon adhered to the surfaces.

3. The method of claim 1, wherein the porous media is a subterranean hydrocarbon bearing formation containing asphaltene and wherein the asphaltene is adhered to the surfaces of the porous media.

4. The method of claim 1, wherein the holding step mobilizes hydrocarbons adhered to the porous media, and the injecting step produces mobilized oil from the production well.

5. The method of claim 1, wherein the hydrocarbon has an API gravity of between 6 and 16.

6. The method of claim 1, wherein the emulsion is an oil in water emulsion.

7. The method of claim 1, wherein the hydrocarbon has an API gravity of between 6 and 12.

8. The method of claim 1, wherein the surfactant of the mixture is selected from the group consisting of anionic surfactants, cationic surfactants, nonionic surfactants, amphoteric surfactants and combinations thereof.

9. The method of claim 1, wherein the co-surfactant of the mixture is an alcohol co-surfactant.

10. The method of claim 9, wherein the alcohol co-surfactant is selected from the group consisting of methanol, ethanol, propanol, butanol, pentanol, isopropanol, and combinations thereof.

11. The method of claim 1, wherein the carrier fluid of the mixture is selected from the group consisting of organic solvents, light hydrocarbons, diluents, light crude oil, water, brine, production water and combinations thereof.

12. The method of claim 1, wherein the carrier fluid of the mixture is a production water with a salinity greater than 5000 ppm and potassium content greater than 80 ppm.

13. The method of claim 1, wherein the surfactant of the mixture is an ethoxylated nonylphenol having between 4 and 60 ethoxylated groups, and wherein the co-surfactant of the mixture is methanol and/or ethanol.

14. The method of claim 13, wherein the mixture contains equal amounts by volume of surfactant and co-surfactant.

15. The method of claim 13, wherein the mixture contains each of the surfactant and the co-surfactant at a concentration of between 0.01 and 3% vol.

16. The method of claim 13, wherein the mixture contains each of the surfactant and the co-surfactant at a concentration of between 0.5 and 1% vol.

17. The method of claim 1, wherein the mixture introduced into the production well is different from the mixture introduced into the injection well.

18. The method of claim 1, wherein the mixture introduced into the production well contains each of the surfactant and the co-surfactant at a concentration of between 0.5 and 5.0% vol.

19. The method of claim 18, wherein the mixture introduced in the production well contains each of the surfactant and the co-surfactant at a concentration of between 1 and 4% vol.

20. The method of claim 1, wherein the mixture introduced into the injection well contains each of the surfactant and the co-surfactant at a concentration of between 0.01 and 2% vol.

21. The method of claim 20, wherein the mixture introduced into the injection well contains each of the surfactant and the co-surfactant at a concentration of between 0.0125 and 0.5% vol.

22. The method of claim 1, wherein the surfaces of the porous media define pore space for the hydrocarbon, and wherein the surfaces are defined by a material selected from the group consisting of quartz, feldspar, siliceous mineral, carbonaceous mineral, clays, and combinations thereof.

23. The method of claim 1, wherein the surfactant of the injection mixture is selected from the group consisting of anionic and nonionic surfactants and combinations thereof.

24. The method of claim 1, wherein the carrier fluid of the injection mixture is selected from the group consisting of water, production water, brine, and combinations thereof.

25. The method of claim 24, further comprising the step of pretesting the carrier fluid of the injection mixture for compatibility with the production stream to allow formation of the emulsion.

26. The method of claim 1, wherein the surfactant of the injection mixture is an ethoxylated alcohol having between 2 and 15 ethoxylated groups, ethoxylated nonylphenol having between 4 and 15 ethoxylated groups, and mixture thereof.

27. The method of claim 26, wherein the injection mixture contains the surfactant at a concentration of between 0.5 and 3% vol.

28. The method of claim 27, wherein the injection mixture contains the surfactant at a concentration of between 1 and 2% vol.

29. The method of claim 1, wherein flow surfaces of the tubing and surface flow line that define space for flow are selected from the group consisting of steel material, alloy material, plastic material, internal coated material and organic synthetic material.

30. The method of claim 1, further comprising the step of breaking the emulsion formed from the production stream and the injection mixture at a desired transitional location, separating an oil phase from a production water phase, regenerating the production water phase to desired conditions, and pumping regenerated water phase downhole as carrier fluid of the injection mixture.

31. The method of claim 30, further comprising, in the desired transitional location, the step of desalting the oil phase, and mixing the desalted oil phase with an aqueous solution comprising water and a surfactant to form a long distance surface transportation oil in water emulsion.

32. The method of claim 31, further comprising the step(s) of:
(a) breaking the long distance surface transportation oil in water emulsion in a desired final location of transportation of the heavy and extra heavy oil,
(b) pumping the aqueous solution back to the transitional location,
(c) regenerating the aqueous solution to a desired amount of concentration of surfactant,
(d) reusing the regenerated aqueous solution comprising water and a surfactant to form with the desalted oil phase a new batch of the oil in water emulsion,
(e) pumping the new batch of oil in water emulsion to the desired final location, and repeating the steps (a)-(e).

33. The method of claim 32, wherein the regenerating step is carried out with an aqueous solution surfactant selected from the group consisting of ethoxylated alcohol having between 2 and 15 ethoxylated groups, ethoxylated nonylphenol having between 4 and 15 ethoxylated groups, and mixtures thereof.

34. The method of claim 33, wherein the regenerated aqueous solution has a surfactant concentration of between 0.5 and 3% vol.

35. The method of claim 33, wherein the regenerated aqueous solution has a surfactant concentration of between 1 and 2% vol.

36. The method of claim 31 wherein the surfactant mixed with the desalted oil phase is an activated natural surfactant present in the desalted oil phase.

37. The method of claim 31, wherein the surfactant mixed with is a mixture of activated natural surfactant the desalted oil phase and a non-ionic surfactant.

38. The method of claim 31 wherein the long distance surface transportation emulsion is a bimodal oil in water emulsion.

39. The method of claim 1, further comprising the steps of:
separating produced water from the production stream of the producing well;
measuring concentration of the surfactant and co-surfactant in the produced water;
adjusting concentration of the surfactant and the co-surfactant in the produced water to a desired injection fluid value; and using adjusted concentration produced water as injection fluid.

40. The method of claim 1, wherein the surfactant of the mixture is an activated natural surfactant present in heavy and extra heavy oil phase present in the pore space.

41. The method of claim 1, wherein the injection fluid comprises a mixture of a surfactant, a co-surfactant and a carrier fluid.

* * * * *